United States Patent [19]

Neri et al.

[11] 4,191,695

[45] Mar. 4, 1980

[54] PROCESS FOR OBTAINING MALEIC ACID ANHYDRIDE

[75] Inventors: Amleto Neri; Sergio Sanchioni, both of Bergamo; Carlo Nava, Scanzorosciate, all of Italy

[73] Assignee: Lonza Ltd., Gampel, Switzerland

[21] Appl. No.: 786,764

[22] Filed: Apr. 12, 1977

[30] Foreign Application Priority Data

Apr. 12, 1976 [CH] Switzerland .................... 4592/76

[51] Int. Cl.$^2$ .......................................... C07D 307/60
[52] U.S. Cl. ............................................. 260/346.76
[58] Field of Search ...................... 260/346.76, 346.74

[56] References Cited

U.S. PATENT DOCUMENTS

| | | | |
|---|---|---|---|
| 2,166,556 | 7/1939 | Spence et al. | 260/346.76 |
| 2,250,091 | 7/1941 | Campbell et al. | 260/346.76 |
| 2,340,490 | 2/1944 | Porter | 260/346.74 |

FOREIGN PATENT DOCUMENTS 2189363 1/1974 France.

OTHER PUBLICATIONS

Wagner et al., Synthetic Organic Chem., N.Y.-Wiley & Sons (1952) pp. 558-559.
Beilstein, Berlin-Springer Verlag (1975) p. 5912.
Mason, J. Chem. Soc., 1930, pp. 700-701.

*Primary Examiner*—Alan L. Rotman
*Assistant Examiner*—Bernard Dentz
*Attorney, Agent, or Firm*—Fisher, Christen & Sabol

[57] ABSTRACT

A process for obtaining maleic acid anhydride from an aqueous maleic acid solution obtained from the gas phase oxidation of at least one organic compound having at least 4 carbon atoms by washing out the reaction gases with water, characterized in that a $H_2O$ exchange is carried out between maleic acid and an organic carboxylic acid anhydride.

33 Claims, No Drawings

PROCESS FOR OBTAINING MALEIC ACID ANHYDRIDE

BACKGROUND OF THIS INVENTION

1. Field of This Invention

This invention relates to a process for obtaining maleic acid anhydride from the aqueous maleic acid solutions obtained from the gas phase oxidation of organic compounds having at least four carbon atoms by washing out the reaction gases with water.

2. Prior Art

Maleic acid anhydride is produced industrially by gas phase oxidation of benzene, butane, butenes, butadiene, etc., in the presence of suitable catalysts and with a large excess of air as oxidation agent. The maleic acid anhydride formed thereby may be separated subsequently in the solid or liquid state in suitable separators. Corresponding to the low steam pressure of maleic acid anhydride in the reaction gas and to the condition of condensing above the thawing point of water (ice), part to the maleic acid anhydride formed passes in gas form through the separator and must be washed out of the gas stream with water or suitable absorption agents. In the case of the use of water as an absorption agent, more or less concentrated aqueous maleic acid solutions with a content of about 20 to 60 percent of maleic acid result.

In the industrial processes which are operable or commercially usable nowadays, no less than 50 percent of the resultant maleic acid anhydride is obtained from an aqueous solution in the form of maleic acid, for example, by means of a film evaporator. Such maleic acid has to be converted in yet another step in the industrial process into maleic acid anhydride.

According to some patents, maleic acid anhydride is absorbed in an organic solvent, whereby the conversion of maleic acid anhydride into the acid and the reconversion of this acid into maleic acid anhydride can be avoided. But the fact alone that none of such patents have ever obtained any commercial value proves to the art that the method of obtaining maleic acid in water is still the most suitable one.

The obtention of maleic acid anhydride from its aqueous solutions can be achieved by several methods, which generally can be classified in two main groups.

The most widely used and customary method consists of the removal of water by azeotropic distillation under atmospheric pressure in the presence of a suitable organic solvent, such as, o-xylene, pseudocumene, etc. At the same time, not only is the solution water removed, maleic acid is converted into maleic acid anhydride by splitting off one mole of water. Subsequent distillation will remove the organic solvent and the thusly-obtained crude maleic acid anhydride is subjected to further purification.

A relatively new method of operation consists of the removal of the water by vacuum distillation. In this way the maleic acid is converted into maleic acid anhydride at temperatures of 150° to 160° C. and the solvent used for this is maleic acid anhydride itself. The conversion of maleic acid into maleic acid anhydride therefore always takes place by thermal treatment in the presence of a solvent which may be o-xylene or maleic acid anhydride.

The main disadvantage lies in the fact, that because of the high temperatures needed for the thermal treatment, a considerable portion of the maleic acid isomerizes to fumaric acid. The fumaric acid which is insoluble under reaction conditions, has a high melting point (about 386° C.) and consequently causes deposits in operating installations, which represents a loss in yield. Also, such installations periodically must be shut down and cleaned, which also raises ecological problems.

BROAD DESCRIPTION OF THIS INVENTION

An object of this invention is to provide a process for the production of maleic anhydride which eliminates the above-described disadvantages of the prior art processes. Other objects and advantages of this invention are set out herein or are obvious to one ordinarily skilled in the art herefrom.

The objects and advantages are obtained by the process of this invention.

This invention eliminates the cited disadvantages of the prior art through the fact, in the process of this advantage, that an $H_2O$ exchange is carried out between the maleic acid and an organic carboxylic acid anhydride.

The end products are maleic acid anhydride and organic acids according to the following reaction scheme:

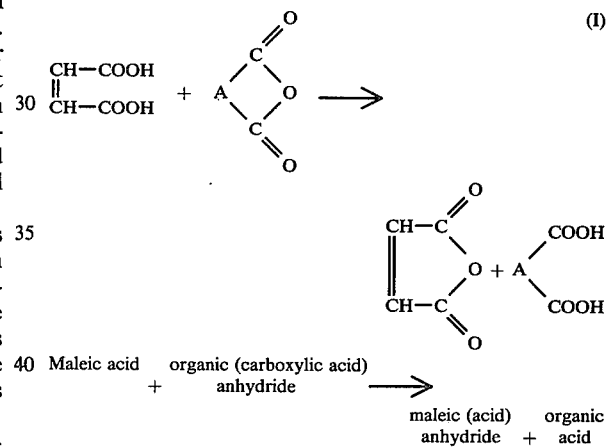

Maleic acid + organic (carboxylic acid) anhydride ⟶ maleic (acid) anhydride + organic acid In the above formulae, the letter A signifies:

(1) Two separate organic monovalent radicals, such as:

(a) two monovalent $CH_3$ groups, whereby the anhydride is acetic acid anhydride;

(b) two monovalent $C_6H_5$ groups, whereby the anhydride is benzoic acid anhydride; or (c) generally any organic monovalent radical from which organic monocarboxylic acids or anhydrides can be derived;

(2) An organic bivalent radical, such as:

(a) the $-CH_2CH_2$ group of succinic acid anhydride;

(b) the $-C_6H_4$ group of phthalic acid anhydride;

(c) the $-C_6H_8$ group of 4-cyclohexene-1,2-dicarboxylic acid anhydride (better known as tetrahydrophthalic acid anhydride) and its isomers;

(d) the $-C_7H_{10}$ group of 4-methyl-cyclohexene-1,2-dicarboxylic acid anhydride and its isomers;

(e) the $-C_6H_{10}$ group of hexahydrophthalic acid anhydride;

(f) the $-C_7H_{12}$ group of 4-methyl-hexahydrophthalic acid anhydride;

(g) generally any bivalent organic radical from which dicarboxylic acids and anhydrides may be derived;

(3) Two or more groups which are suitable to produce a mixture of anhydrides of the types defined in (1) and (2); or (4) Two monovalent groups which differ from one another, such as:

(a) a CH₃ group and a C₂H₅ group, whereby the anhydride is acetic propionic acid anhydride.

Specific examples of useful organic (carboxylic acid) anhydrides are acetic anhydride (ethanoic anhydride), acetic butyric anhydride (ethanoic butanoic anhydride), glutaric anhydride, succinic anhydride, adipic anhydride, butyric anhydride, propionic anhydride, α-anhydride or levulinic acid, phthalic anhydride, β-anhydride of levulinic acid, benzoic anhydride, butanedoic anhydride, tetrahydrophthalic anhydride, acetic propionic anhydride, 4-methyl-cyclohexene-1,2-dicarboxylic anhydride, hexahydrophthalic anhydride and 4-methylhexahydrophthalic anhydride. Simple anhydrides and mixed anhydrides can be used.

The reaction takes place at a relatively low temperature between 50° and 200° C., preferably between 100° and 130° C.

The ratio of organic anhydride to maleic acid may vary from a minimum of 1 mole of organic anhydride per mole of maleic acid up to a maximum of 10 moles organic anhydride per mole of maleic acid.

The reaction can take place in any inert solvent, such as, o-xylene, cyclohexane, chlorobenzene, etc. The reaction may be carried out continuously or intermittently. The conversion of maleic acid into maleic acid anhydride may be accomplished up to a desired degree or completely, depending on economic and other factors.

After reaching the desired degree of conversion, the reaction products are separated according to the customary physical methods. The maleic acid anhydride obtained is further purified (for example, distilled)—unconverted maleic acid (in case there is any such unconverted acid present) is recycled into the dehydration stage, and the organic acid is subjected to a suitable treatment, e.g., thermal treatment, in order to recapture the organic anhydride, which is returned to the dehydration stage.

The separation of the reaction products is easy whenever an organic dicarboxylic acid or its anhydrides is used as agents for splitting off water. Since organic dicarboxylic acids are practically insoluble in maleic anhydride, the reaction products can be separated by filtration, centrifuging, etc. In the case of the use of organic monocarboxylic acid, such as acetic acid, benzoic acid or their anhydrides, the separation can be accomplished by fractional distillation.

This invention, the basic features of which had been set out in the preceding paragraphs, has the following fundamental, new process characteristics. The conversion of maleic acid into maleic acid anhydride is no longer carried out by thermal treatment but is achieved by means of a chemical reaction at such low temperatures that the customary impurities forming at higher temperatures and the separation of which causes difficulties and problems no longer result —above all, however, the isomerization of maleic acid into fumaric acid is nearly impossible. This invention thus not only permits considerable simplification of the hitherto used methods of processing, but also the achievement of high quantitative yields. The fact that essentially no fumaric acid is formed offers the additional advantages that no deposits of material having a high melting point are formed - consequently no time consuming interruptions result from the periodic cleaning of the production installation, there is no formation of residues and contaminating washing solutions and there is an actual continuously running process.

As used herein, all parts, weights and ratios are on a weight basis, unless otherwise stated herein or otherwise obvious to one ordinarily skilled in the art.

EXAMPLE 1

116.1 gm. (1 mole) of maleic acid was treated with 255.2 gm. (2.5 moles) of acetic acid anhydride at 120° C. for 2 hours in the presence of 200 gm. of o-xylene. At the end of the reaction, the following and ingredients products together with o-xylene, were found in the reaction mixture:

| | |
|---|---|
| maleic acid anhydride | 97.4 gm (molar yield, 99.3%) |
| acetic acid | 119.3 gm. |
| maleic acid (uncoverted) | 0.8 gm. |
| acetic acid anhydride | 153.8 gm. |

No formation of fumaric acid was found. The above-listed materials remained unchanged with time.

EXAMPLE 2

116.1 gm (1 mole) of maleic acid was treated for 3 hours with 120.1 gm. (1.2 mole) of succinic acid anhydride at 125° C. At the end of the reaction, the following products and ingredients were found in the reaction mixture:

| | |
|---|---|
| maleic acid anhydride | 96.2 gm (molar yield, 98.1%) |
| succinic acid | 115.8 gm. |
| maleic acid (uncoverted) | 2.1 gm. |
| succinic acid anhyride | 21.9 gm. |
| fumaric acid | trace |

EXAMPLE 3

116.1 gm. (1 mole) of maleic acid was treated for 2 hours in the presence of o-xylene with 269.2 gm (2 mole) of phthalic acid anhydride at 110° C. At the end of the reaction the following products and ingredients, together with o-xylene, were found in the reaction mixture:

| | |
|---|---|
| maleic acid anhydride | 92.2 gm (molar yield, 94.0%) |
| phthalic acid | 156.2 gm. |
| maleic acid (uncoverted) | 7.0 gm. |
| phthalic acid anhydride | 156.9 gm |

EXAMPLE 4

116.1 gm (1 mole) of maleic acid was treated for 2 hours with 462.3 gm (3 moles) of hexahydrophthalic acid anhydride at 120° C. At the end of the reaction, the following products and ingredients were found in the reaction mixture:

| | |
|---|---|
| maleic acid | 97.6 gm (molar yield, 99.5%) |
| hexahydrophthalic acid | 171.3 gm. |
| maleic acid (unconverted) | 0.6 gm |
| hexahydrophthatlic acid | |

-continued

| | |
|---|---|
| anhydride | 309.0 gm |

No formation of fumaric acid was noticed.

EXAMPLE 5

116.1 gm (1 mole) of maleic acid was treated for 1 hour with 336.4 gm (2 moles) of 4-methyl-hexahydrophthalic acid anhydride at 115° C. At the end of the reaction, the following products and ingredients were found in the reaction mixture:

| | |
|---|---|
| maleic acid anhydride | 88.5 gm (molar yield, 90.3%) |
| 4-methyl-hexahydrophthalic acid | 168.0 gm. |
| maleic acid (unconverted) | 11.3 gm |
| 4-methyl-hexahydrophthalic acid anhydride | 184.6 gm. |

No formation of fumaric acid was noticed.

The water present as a solvent for maleic acid (preceding the chemical splitting off of water with an organic carboxylic acid anhydride) can be removed by one of the known methods, such as vaporizing to dryness, concentration with subsequent crystallization, etc. It is recommended that this operation be carried out at relatively low temperatures (below 70° C.) or under conditions which involve higher temperatures only for a short period of time, such as, in film evaporators, in order to prevent the formation of fumaric acid.

The process of the invention can also be used directly for obtaining maleic acid anhydride from a maleic acid free of water.

What is claimed is:

1. A process for preparing maleic acid anhydride which comprises: (1) obtaining an aqueous maleic acid solution by washing the reaction gases from the gas phase oxidation of at least one organic compound having at least 4 carbon atoms with water; (ii) removing the water from the aqueous maleic acid solution, maleic acid resulting; (iii) the step which consists of dehydrating the maleic acid to maleic acid anhydride in the presence of an organic carboxylic acid anhydride, there being a H₂O exchange between the maleic acid and the organic carboxylic acid anhydride according to the following formula:

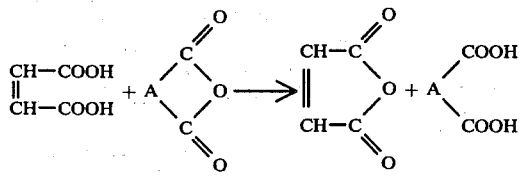

wherein A is two monovalent organic radicals or one divalent organic radical, the dehydration reaction taking place at a temperature between 100° and 130° C., and there being present from one mole to 3 moles of organic carboxylic acid anhydride per mole of maleic acid, and (iv) isolating the maleic acid anhydride, said isolation being achieved by centrifugation or filtration when the organic carboxylic acid anhydride or step (iii) is an organic dicarboxylic acid anhydride and said isolation being achieved by fractional distillation when the organic carboxylic acid anhydride of step (iii) is an organic monocarboxylic acid anhydride.

2. A process as claimed in claim 1 wherein 1.1 to 2.5 moles of the organic carboxylic acid anhydride is used per mole of maleic acid.

3. A process as claimed in claim 1 wherein the organic carboxylic acid anhydride has the formula:

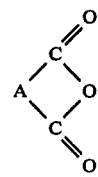

wherein A is: (1) two separate organic monovalent radicals; (2) an organic bivalent radical; or (3) two or more groups which produce a mixture of anhydrides of the types defined in (1) and (2).

4. A process as claimed in claim 3 wherein A is:
   (a) two monovalent —CH₃ groups, whereby the anhydride is acetic acid anhydride;
   (b) two monovalent —C₆H₅ groups, whereby the anhydride is benzoic acid anhydride;
   (c) the —CH₂CH₂— group of succinic acid anhydride;
   (d) the —C₆H₄— group of phthalic acid anhydride;
   (e) the —C₆H₈— group of 4-cyclohexene-1,2-dicarboxylic acid anhydride or one of its isomers;
   (f) the —C₇H₁₀-group of 4-methyl-cyclohexene-1,2-dicarboxylic acid anhydride or one of its isomers;
   (g) the —C₆H₁₀— group of hexahydrophthalic acid anhydride;
   (h) the —C₇H₁₂— group of 4-methyl-hexahydrophthalic acid anhydride;
   (i) two or more groups which produce a mixture of anhydrides of the types defined in (a) to (h); or
   (j) a —CH₃ group and a —C₂H₅ group, whereby the anhydride is acetic propionic acid anhydride.

5. A process as claimed in claim 3 wherein said A is the organic carboxylic acid anhydride is two separate organic monovalent radicals.

6. A process as claimed in claim 3 wherein said A in the organic carboxylic acid anhydride is an organic bivalent radical.

7. A process as claimed in claim 1 wherein an organic acid, formed from the organic carboxylic acid anhydride during the dehydration reaction, is subjected to thermal treatment and is returned to the dehydration stage.

8. A process as claimed in claim 1 wherein hexahydrophthalic acid anhydride is used as the organic carboxylic acid anhydride.

9. A process as claimed in claim 1 wherein the dehydration occurs at atmospheric pressure.

10. A process as claimed in claim 1 wherein the isolated maleic acid anhydride is further purified by distillation.

11. A process as claimed in claim 1 wherein the maleic acid anhydride is isolated, when an organic dicarboxylic acid anhydride is used, by filtration, or centrifugation.

12. A process as claimed in claim 1 wherein the maleic acid anhydride is isolated, when an organic monocarboxylic acid anhydride is used, by fractional distillation.

13. A process as claimed in claim 1 wherein the organic carboxylic acid anhydride is acetic anhydride, acetic butyric anhydride, glutaric anhydride, succinic anhydride, adipic anhydride, butyric anhydride, propionic anhydride, α-anhydride of levulinic acid, phthalic anhydride, β-anhydride of levulinic acid, benzoic anhydride, butanedioic anhydride, tetrahydrophthalic anhydride, acetic propionic anhydride, 4-methyl-cyclohexene-1,2-dicarboxylic anhydride, hexahydrophthalic anhydride or 4-methylhexahydrophthalic anhydride.

14. A process as claimed in claim 1 wherein, in step (ii) the water is removed at a temperature below 70° C. or which involves a higher temperature for only a short period of time.

15. A process for preparing maleic acid anhydride which comprises: (i) obtaining an aqueous maleic acid solution by washing the reaction gases from the gas phase oxidation of at least one organic compound having at least 4 carbon atoms with water; (ii) removing the water from the aqueous maleic acid solution, maleic acid resulting; (iii) the step which consists of dehydrating the maleic acid to maleic acid anhydride in the presence of an organic carboxylic acid anhydride and an inert solvent, there being a H₂O exchange between the maleic acid and the organic carboxylic acid anhydride according to the following formula:

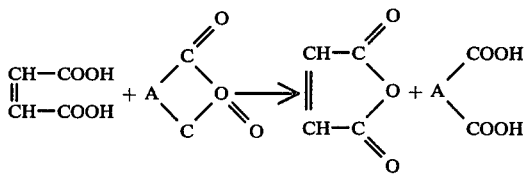

wherein A is two monovalent organic radicals or one divalent organic radical, the dehydration reaction taking place at a temperature between 100° and 130° C., and there being present from one mole to 3 moles of organic carboxylic acid anhydride per mole of maleic acid; and (iv) isolating the maleic acid anhydride, said isolation being achieved by centrifugation or filtration when the organic carboxylic acid anhydride of step (iii) is an organic dicarboxylic acid anhydride and said isolation being achieved by fractional distillation when the organic carboxylic acid anhydride of step (iii) is an organic monocarboxylic acid anhydride.

16. A process as claimed in claim 15 wherein 1.1 to 2.5 moles of the organic carboxylic acid anhydride is used per mole of maleic acid.

17. A process as described in claim 15 wherein the organic carboxylic acid anhydride has the formula:

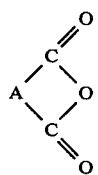

wherein A is: (1) two separate organic monovalent radicals; (2) an organic bivalent radical; or (3) two or more groups which produce a mixture of anhydrides of the types defined in (1) and (2).

18. A process as claimed in claim 17 wherein A is:
(a) two monovalent —CH₃ groups, whereby the anhydride is acetic acid anhydride;
(b) two monovalent —C₆H₅ groups, whereby the anhydride is benzoic acid anhydride;
(c) the —CH₂CH₂— group of succinic acid anhydride;
(d) the —C₆H₄— group of phthalic acid anhydride;
(e) the —C₆H₈— group of 4-cyclohexene-1,2-dicarboxylic acid anhydride or one of its isomers;
(f) the —C₇H₁₀— group of 4-methyl-cyclohexene-1,2-dicarboxylic acid anhydride or one of its isomers;
(g) the —C₆H₁₀— group of hexahydrophthalic acid anhydride;
(h) the —C₇H₁₂— group of 4-methyl-hexahydrophthalic acid anhydride;
(i) two or more groups which produce a mixture of anhydrides of the types defined in (a) to (h) or
(j) a —CH₃ group and a —C₂H₅ group, whereby the anhydride is acetic propionic acid anhydride.

19. A process as claimed in claim 17 wherein said A in the organic carboxylic acid anhydride is two separate organic monovalent radicals.

20. A process as claimed in claim 17 wherein said A in the organic carboxylic acid anhydride is an organic bivalent radical.

21. A process as claimed in claim 15 wherein an organic acid, formed from the organic carboxylic acid anhydride during the dehydration reaction, is subjected to thermal treatment and is returned to the dehydration stage.

22. A process as claimed in claim 15 wherein hexahydrophthalic acid anhydride is used as the organic carboxylic acid anhydride.

23. A process as claimed in claim 15 wherein the isolated maleic acid anhydride is further purified by distillation.

24. A process as claimed in claim 15 wherein the maleic acid anhydride is isolated, when an organic dicarboxylic acid anhydride is used, by filtration or centrifugation.

25. A process as claimed in claim 15 wherein the maleic acid anhydride is isolated, when an organic monocarboxylic acid anhydride is used, by fractional distillation.

26. A process as claimed in claim 15 wherein the organic carboxylic acid anhydride is acetic anhydride, acetic butyric anhydride, glutaric anhydride, succinic anhydride, adipic anhydride, butyric anhydride, propionic anhydride, α-anhydride of levulinic acid, phthalic anhydride, β-anhydride or levulinic acid, benzoic anhydride, butanedioic anhydride, tetrahydrophthalic anhydride, acetic propionic anhydride, 4-methyl-cyclohexene-1,2-dicarboxylic anhydride, hexahydrophthalic anhydride or 4-methyl-hexahydrophthalic anhydride.

27. A process as claimed in claim 15 wherein the water is removed at a temperature below 70° C. or which involves a higher temperature for only a short period of time.

28. A process as claimed in claim 15 wherein said solvent is o-xylene, cyclohexene or chlorobenzene.

29. A process for preparing maleic acid anhydride which comprises: (i) obtaining an aqueous maleic acid solution by washing the reaction gases from the gas phase oxidation of at least one organic compound having at least 4 carbon atoms with water; (ii) removing the water from the aqueous maleic acid solution, maleic acid resulting; (iii) the step which consists of dehydrating the maleic acid to maleic acid anhydride, there being a H₂O exchange between the maleic acid and the organic carboxylic acid anhydride according to the following formula:

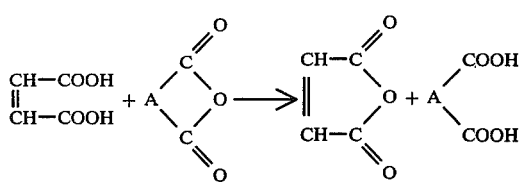

wherein A is:
(a) two monovalent —CH₃ groups, whereby the anhydride is acetic acid anhydride;
(b) two monovalent —C₆H₅ groups, whereby the anhydride is benzoic acid anhydride;
(c) the —CH₂CH₂—group of succinic acid anhydride;
(d) the —C₆H₈— group of 4-cyclohexene-1,2-dicarboxylic acid anhydride or one of its isomers;
(e) the —C₇H₁₀— group of 4-methyl-cyclohexene-1,2-dicarboxylic acid anhydride or one of its isomers;
(f) the —C₆H₁₀— group of hexahydrophthalic acid anhydride;
(g) the —C₇H₁₂— group of 4-methyl-hexahydrophthalic acid anhydride; or
(h) a —CH₃ group and a —C₂H₅ group whereby the anhydride is acetic propionic acid anhydride,
the dehydration reaction taking place at a temperature between 100° and 130° C., and there being present from one mole to 3 moles of organic carboxylic acid anhydride per mole of maleic acid; and (iv) isolating the maleic acid anhydride, said isolation being achieved by centrifugation or filtration when the organic carboxylic acid anhydride of step (iii) is an organic dicarboxylic acid anhydride and said isolation being achieved by fractional distillation when the organic carboxylic acid anhydride of step (iii) is an organic monocarboxylic acid anhydride.

30. A process as claimed in claim 29 wherein, in step (ii), the water is removed at a temperature below 70° C. or which involves a higher temperature for only a short period of time, wherein the dehydration occurs at atmospheric pressure, wherein 1.1 to 2.5 moles of the organic carboxylic acid anhydride is used per mole of maleic acid, wherein the maleic acid anhydride is isolated by filtration or centrifugation, wherein the isolated maleic acid is further purified by distillation, and wherein an organic acid, formed from the organic carboxylic acid anhydride during the dehydration reaction, is subjected to thermal treatment and is returned to the dehydration stage.

31. A process for preparing maleic acid anhydride which comprises: (i) obtaining an aqueous maleic acid solution by washing the reaction gases from the gas phase oxidation of at least one organic compound having at least 4 carbon atoms with water; (ii) removing the water from the aqueous maleic acid solution, maleic acid resulting; (iii) the step which consists of dehydrating the maleic acid to maleic acid anhydride in the presence of an organic carboxylic acid anydride and an inert solvent, there being an H₂O exchange between the maleic acid and the organic carboxylic acid anhydride according to the following formula:

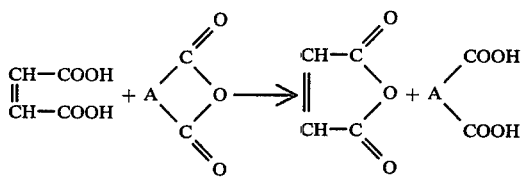

wherein A is:
(a) two monovalent —CH₃ groups, whereby the anhydride is acetic acid anhydride;
(b) two monovalent —C₆H₅ groups, whereby the anhydride is benzoic acid anhydride;
(c) the —CH₂CH₂— group of succinic acid anhydride;
(d) the —C₆H₈— group of 4-cyclohexene-1,2-dicarboxylic acid or one of its isomers;
(e) the —C₇H₁₀— group of 4-methyl-cyclohexene-1,2-dicarboxylic acid anhydride or one of its isomers;
(f) the —C₆H₁₀— group of hexahydrophthalic acid anhydride;
(g) the —C₇H₁₂— group of 4-methyl-hexahydrophthalic acid anhydride; or
(h) a —CH₃ group and a —C₂H₅ group, whereby the anhydride is acetic propionic acid anhydride,
the dehydration reaction taking place at a temperature between 100° and 130° C., and there being present from one mole to 3 moles or organic carboxylic acid anhydride per mole of maleic acid; and (iv) isolating the maleic acid anhydride, said isolation being achieved by centrifugation or filtration when the organic carboxylic acid anhydride of step (iii) is an organic dicarboxylic acid anhydride and said solution being achieved by fractional distillation when the organic carboxylic acid anydride of step (iii) is an organic monocarboxylic acid anhydride.

32. A process as claimed in claim 31 wherein the water is removed at a temperature below 70° C. or which involves a higher temperature for only a short period of time, wherein the dehydration occurs at atmospheric pressure, wherein 1.1 to 2.5 moles of the organic carboxylic acid anhydride is used per mole of maleic acid, wherein the maleic acid anhydride is isolated, by filtration or centrifugation, wherein the isolated maleic acid anhydride is further purified by distillation, and wherein an organic acid, formed from the organic carboxylic acid anhydride during the dehydration reaction is subjected to thermal treatment and is returned to the dehydration stage.

33. A process as claimed in claim 31 wherein said inert solvent is o-xylene, cyclohexane or chlorobenzene.

* * * * *